United States Patent [19]

Skog et al.

[11] Patent Number: 5,060,776

[45] Date of Patent: Oct. 29, 1991

[54] ARRANGEMENT FOR CONTROLLING A HYDRAULICALLY OPERATED FRICTION DISC CLUTCH WITH DIAPHRAGM SPRING

[75] Inventors: Lars Skog, Södertälje; Tommy Nordling, Trosa, both of Sweden; Per-Ola Svenke, Kongsberg, Norway

[73] Assignee: Saab Automobile Aktiebolag, Sweden

[21] Appl. No.: 585,062

[22] PCT Filed: Apr. 20, 1989

[86] PCT No.: PCT/SE89/00221

§ 371 Date: Oct. 19, 1990

§ 102(e) Date: Oct. 19, 1990

[87] PCT Pub. No.: WO89/10494

PCT Pub. Date: Nov. 2, 1989

[30] Foreign Application Priority Data

Apr. 22, 1988 [SE] Sweden .............................. 8801499

[51] Int. Cl.$^5$ ...................... F16D 25/12; B60K 23/02
[52] U.S. Cl. ................ 192/85 R; 192/91 R; 60/533
[58] Field of Search ............. 192/85 R, 85 CA, 91 R, 192/91 A, 101; 60/533, 547.1, 548

[56] References Cited

U.S. PATENT DOCUMENTS

| 2,593,192 | 4/1952 | Rockwell | 192/91 A X |
|---|---|---|---|
| 2,967,396 | 1/1961 | Staadt | 192/91 A X |
| 3,709,340 | 1/1973 | Murakami et al. | 192/91 R X |
| 3,752,282 | 8/1973 | Espenshied | 192/91 R |
| 4,878,396 | 11/1989 | Grunberg | 74/518 |

OTHER PUBLICATIONS

Abstract of EP 158 004 corresponding to DE 34 13 983.

Primary Examiner—Richard Lorence
Attorney, Agent, or Firm—Ostrolenk, Faber, Gerb & Soffen

[57] ABSTRACT

The invention relates to an arrangement for automatic control of a hydraulically operated friction disc clutch with diaphragm spring. The hydraulic operating unit comprises a hydraulic cylinder which, by acting on the diaphragm spring, disengages the friction disc clutch. In order to obtain a hydraulic operating unit in which the regulating pressure is proportional to the disengagement degree of the clutch, the hydraulic cylinder comprises a proportionality-forming spring which acts against the hydraulic cylinder piston during the final part of the disengagement stroke of the piston. In a system with master cylinder and slave cylinder, where the slave cylinder acts on the diaphragm spring for disengagement of the friction disc clutch, the master cylinder is also provided with a pressure supply, compensating for wear of the discs, via a hydraulic channel which is closed off at a predetermined regulating pressure level. The invention permits a simplified system solution for an automated diaphragm spring clutch in a vehicle, where the clutch does not require any positional sensors, but the disengagement degree is given by the hydraulic regulating device.

29 Claims, 2 Drawing Sheets

ARRANGEMENT FOR CONTROLLING A HYDRAULICALLY OPERATED FRICTION DISC CLUTCH WITH DIAPHRAGM SPRING

The invention relates to an arrangement for controlling a hydraulically operated friction disk clutch that is provided with a diaphragm spring, the control being provided through an operating unit including a hydraulic piston that acts on the diaphragm spring to release the engagement of the clutch disks. The hydraulic piston is controlled by a pressure medium which in turn is controlled by a control signal proportional to the extent of the disengagement of the clutch disks. The invention particularly relates to a spring associated with the hydraulic piston and which comes into action to control the releasing motion of the diaphragm spring as the hydraulic piston shifts.

BACKGROUND OF THE INVENTION

For operating a conventional friction clutch between an engine and a transmission box in, for example, a motor vehicle, it is already known to use hydraulic operating mechanisms with a master cylinder actuated by the clutch pedal and a slave cylinder located at the clutch. This cylinder either pulls or exerts pressure on a spring-compressed disc clutch for disengagement. A pressure clutch of this type is shown, for example, in U.S. Pat. No. 3,489,257.

However, development of clutch systems, especially for motor vehicles, is moving towards more or less automated clutch functions. In automated clutch systems an electronic control unit can regulate the entire engagement and disengagement procedure, so that the clutch at all times acquires an optimum slippage function at each speed difference which can occur between the input shaft and the output shaft of the clutch. An automated clutch can also regulate the slippage level in the clutch in order to achieve damping of torque pulses. This technique is described in, for example, U.S. Pat. Nos. 4,253,414 and 4,457,411.

A majority of motor vehicle clutches comprise a diaphragm spring pressing the friction discs together. A solution for disengaging friction disc clutches held together by a diaphragm spring is previously disclosed in GB Patent No. 2,117,076 corresponding to U.S. Pat. No. 4,878,396. In this respect use is made of an electric motor of the low output type, for example a windscreen wiper motor, which is able to disengage the friction disc clutch by means of a compensating spring arrangement acting over the entire disengagement stroke. The compensating springs provide a force counter-acting the diaphragm spring, which force follows the force and deflection characteristic of the diaphragm spring over the entire stroke. In this way the power requirement of the electric motor can be kept low, by which means it is possible, with a small and inexpensive motor, to obtain a system which is suitable for an automated clutch function. However, the compensating spring construction is relatively complicated, since the diaphragm spring does not have a linear force and deflection characteristic over the entire disengagement stroke. Moreover, the system does not have the same quick response of a hydraulic system.

The advantage of a disc clutch held together by a diaphragm spring is that the axial dimension of the clutch can be kept low. In the case of a conventional manually effected disengagement, there is also a decreased power requirement at the end of the disengagement movement. In this way the driver can hold the clutch pedal down in the bottom position for a longer period of time without becoming tired. The diaphragm springs which are present in clutches in today's cars also afford an extremely reliable and functional clutch at a reasonable cost and with an extremely long service life of the diaphragm spring itself.

SUMMARY OF THE INVENTION

The object of the present invention is to provide for an automated hydraulic operating of a friction disc clutch held together with a diaphragm spring and with a simple hydraulic piston cylinder. In order to automate a hydraulically operated diaphragm spring clutch, the system can be modified so that, at each specific operating pressure, the clutch acquires a predetermined disengagement degree. This eliminates the need for expensive positional indicators in the clutch. To this end, the arrangement of the invention includes a spring which cooperates with the hydraulic piston to oppose movement of the hydraulic piston to the second position after the hydraulic piston has moved from the first position to an intermediate position. The spring applies an increasing force to oppose movement of the hydraulic piston to the second position, which imposes an increasing force requirement while the diaphragm spring is decreasing its engaging force on the clutch disks. The spring is dimensioned and adapted so that an essentially proportionally increasing force requirement is obtained over essentially the whole disengagement stroke of the hydraulic piston, at least from the intermediate position to the second end position of the hydraulic piston.

The invention can be used both in systems with an operating cylinder acting directly on the diaphragm spring, and in systems with master-slave cylinder. Integrating the proportionality-forming spring in a hydraulic cylinder means that this spring is given a well-protected position, so that operational reliability and functioning are ensured.

In a system with master and slave cylinder, a proportionality-forming spring can be integrated in the master cylinder or in the slave cylinder, or in both these cylinders. This makes it possible, when constructing the system, to position the proportionality-forming spring where there is space in the clutch system and car model in question, either in a master cylinder mounted remote from the clutch or in the slave cylinder close to the clutch.

In an advantageous embodiment of a master-slave cylinder construction in the arrangement according to the invention, the master cylinder can be designed so that at the same time a clearance adjustment of the disengagement mechanism is obtained as the discs in the clutch are worn, and a constant prestressing of the slave cylinder against the diaphragm spring is made possible. To this end, the arrangement is characterized by the provision of a restricted inlet or channel connected from the pressure source into the bore of the master cylinder at the outlet side of the master cylinder which is the side of the master cylinder communicating with the inlet side of the slave cylinder. The restricted inlet communicates into the master cylinder bore only when the piston of the master cylinder is in its first, neutral end position. There is a radial seal around the piston in the master cylinder which seals the bore of that cylinder and the seal is placed to enable pressure inlet into the master cylinder through the restricted inlet when the master piston is in its first position.

In a further advantageous embodiment, the master cylinder piston is designed in such a way that, at a predetermined pressure level, a proportional valve guarantees closure of a clearance-adjusting and prestress-forming channel. The design of the master cylinder piston also provides for a power increase, by reason of which a smaller and less expensive hydraulic pump can be chosen. To this end, the arrangement is such that the master cylinder is stepped in the axial direction and the piston in the master cylinder is correspondingly shaped so that it has a larger surface area at its end toward the pressure source inlet side of the master cylinder and a smaller surface area at its end toward the outlet side of the master cylinder. The spring is a return spring arranged in the master cylinder for forcing the piston of the master cylinder toward its first end position.

The essential feature according to the invention provides for an extremely simple and inexpensive hydraulic cylinder construction for proportional control of a clutch with essentially only one movable piston which acts directly on the diaphragm spring with springs arranged in the hydraulic cylinder and acting on the piston.

The restricted inlet or channel into the master cylinder, combined with the stepped shape of the piston of the master cylinder and coupled with the spring for the hydraulic piston and particularly such spring at the piston of the master cylinder also permit clearance adjustment, prestressing of the clutch and a reliable disengagement function at predetermined pressure levels, without the hydraulic cylinder construction departing from its simple basic design.

A hydraulic cylinder designed as a master cylinder according to the invention also makes it possible for a slave cylinder construction, which is incorporated in a manual system, to be used in an automated clutch with proportionately increasing power requirements over the disengagement stroke. The same drive-line layout can thus be used in both manual and automated clutch systems. This is of particularly great importance in motor vehicles where the components in the drive-line engine, clutch and transmission box - have a limited space in the engine bay. The master cylinder construction can be positioned wherever desired in the available space in the engine bay and not necessarily close to the clutch.

Other characterizing features will emerge from the patent claims and the following description of an embodiment of the arrangement according to the invention. In the description, reference is made to the attached figures.

DESCRIPTION OF AN EXEMPLARY EMBODIMENT

Figure 1:
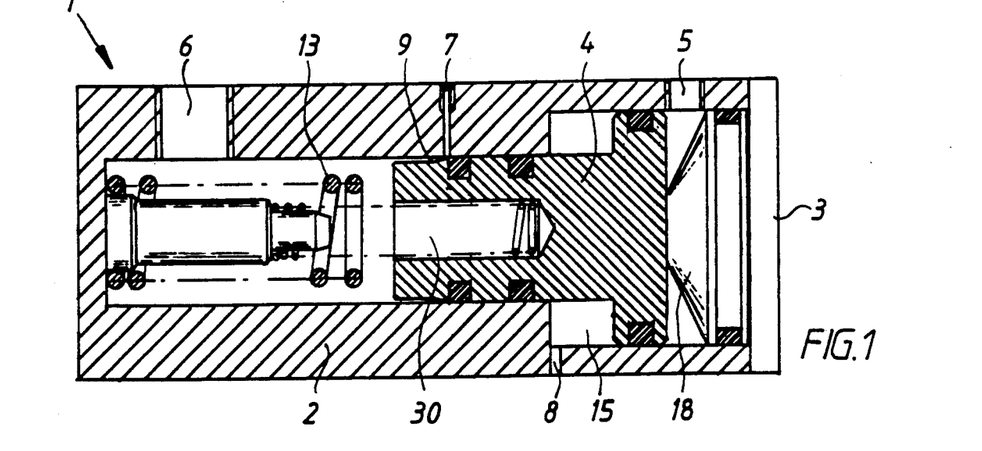
FIG. 1 shows a master cylinder according to the invention in partial axial section with the piston in a neutral position, where the clutch is in engagement.
Figure 2:
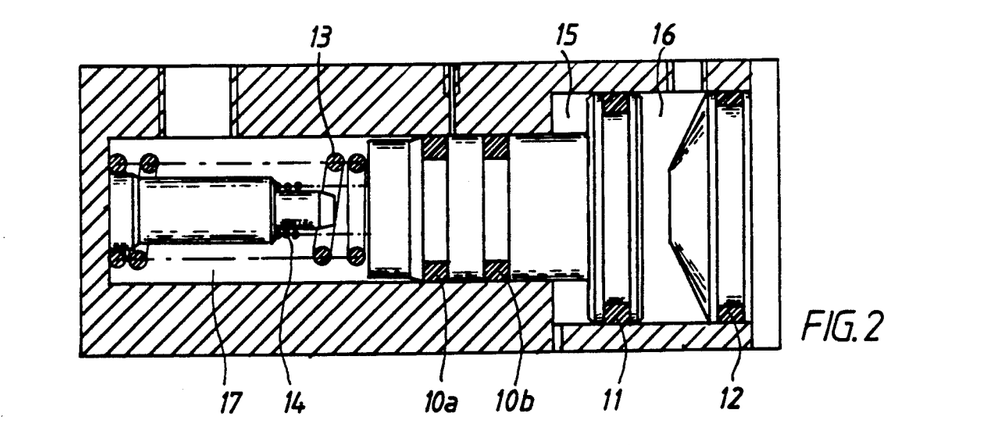
FIG. 2 shows the master cylinder with only the master cylinder housing, the springs and the sealing rings of the piston in section. Here, the master cylinder piston is in an intermediate position, in which the piston is beginning to engage against a proportionality-forming spring, in which position the clutch is partially disengaged.
Figure 3:
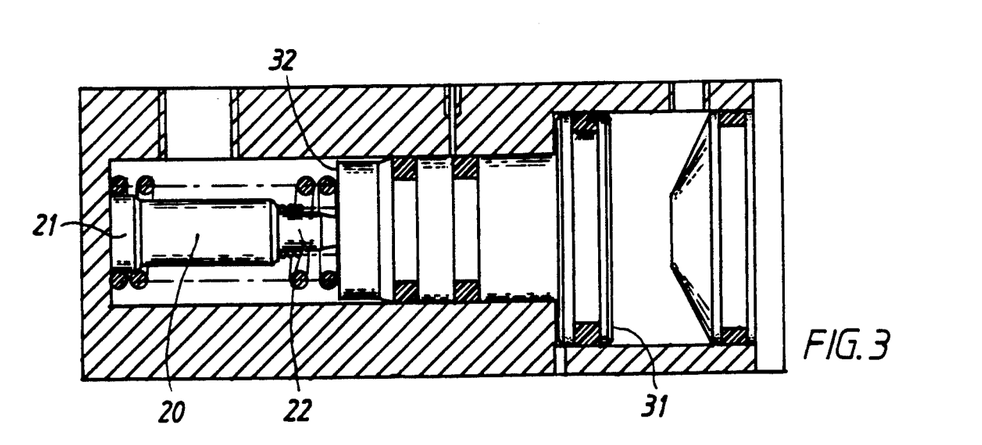
FIG. 3 shows the master cylinder in the same section as in FIG. 2, with the piston in an operational end position in which the clutch is completely disengaged.

FIGS. 1-3 show a master cylinder 1 according to the invention in three different operational positions.

The master cylinder 1 has a housing 2 made in one piece with an open end closed by means of a sealed end cap 3. The housing is advantageously bored out from the end in two stages in the axial direction, with a first outer bore which is close to the end and has a greater diameter than a second inner bore. The bores accommodate a piston 4 which is axially movable between two end positions shown in FIGS. 1 and 3.

The piston is step-shaped corresponding to the bores, with a larger part directed towards the end and running in the first bore, and a smaller part directed away from the end and running in the second bore. The larger part of the piston 4 is sealed off, by means of a radial seal 11, against the wall of the first bore, while the smaller part of the piston 4 is sealed off, by means of two radial seals 10a, 10b, against the wall of the second bore. At the bottom of the smaller bore there is also a spring-centering device 20. On the spring-centering device there is a return spring 14 which is stressed against the piston 4 so that, in the neutral position according to FIG. 1, the piston is pressed against a stop lug 18 formed on the end cap 3. The return spring 14 is centered on an outer part 22 of the spring-centering device 20 and an axial bore 30 in the piston 4. The return spring 14 has a low spring constant and is simply designed to ensure that the piston returns completely to the neutral end position where it bears against the stop lug 18 and where the piston is not acted upon by any regulating pressure.

Also arranged on the spring-centering device 20 is a powerful proportionality-forming spring 13, which is hereinafter referred to as the main spring, with a significantly higher spring constant than the return spring 14. The main spring 13 is centered on a large base part 21 of the device 20 and lies coaxially outside the return spring 14. The length of the main spring 13 is designed so that it comes into spring engagement between the piston 4 and the base of the smaller bore only when the piston 4 has left its neutral position according to FIG. 1 and has reached an intermediate position as shown in FIG. 2. In this way, the main spring 13 provides a counter-directed and increasing force during the continued movement of the piston towards the operating end position shown in FIG. 3. The force arising from the main spring 13 from the intermediate position is added to the force from a diaphragm spring incorporated in the clutch, which forces are to be overcome by the regulating pressure of the master cylinder for the purpose of complete disengagement.

The position of the master cylinder piston 4 is controlled by means of a hydraulic pressure acting on the top side 31 of the piston in FIGS. 1-3. The regulating pressure is supplied to the inlet chamber 16 via a channel 5 in the master cylinder housing 2, by means of which the hydraulic pressure prevailing in the inlet chamber 16 provides a force which acts on the inlet side 31 of the piston and will push the piston 4 to the left towards the operating end position shown in FIG. 3.

With a sufficiently high regulating pressure in the inlet chamber 16, the piston 4 moves from the neutral position in FIG. 1 to the operating end position shown in FIG. 3, while a hydraulic fluid volume situated in the space 17 is forced out through an outlet channel 6 and acts upon a slave cylinder for disengaging a diaphragm spring clutch.

The master cylinder housing 2 also comprises a restricted inlet channel 7 which opens out in the wall of the second bore. The restricted channel 7 is only open to the space 17 when the piston 4 is in its neutral end position according to FIG. 1. In this end position the radial seal 10a leaves the channel opening free with respect to a bevel 9 on the piston 4. By means of moderate pressure of a hydraulic fluid supplied to the channel 7, the oil volume between the master cylinder and the slave cylinder can be automatically controlled in the neutral end position. This compensates for wearing of the discs in the diaphragm spring clutch, which wear otherwise leads to the slave cylinder changing its neutral position. Moderate pressure also provides for a certain pre-stressing of the slave cylinder against the diaphragm spring in the neutral end position. The pre-stressing eliminates any possible looseness between the master cylinder movement and the subsequent diaphragm spring actuation.

The space 15 to the other side of the pressurized space 16 of the piston 4 is drained to the atmosphere via a channel 8. This prevents any leakage flow past the radial seal 11 of the piston from forming any back pressure. The smaller part of the piston 4 also comprises a second radial seal 10b which counteracts any leakage of hydraulic fluid from the channel 7 to the drained space 15 when the piston is not in its neutral end position.

Figure 4:
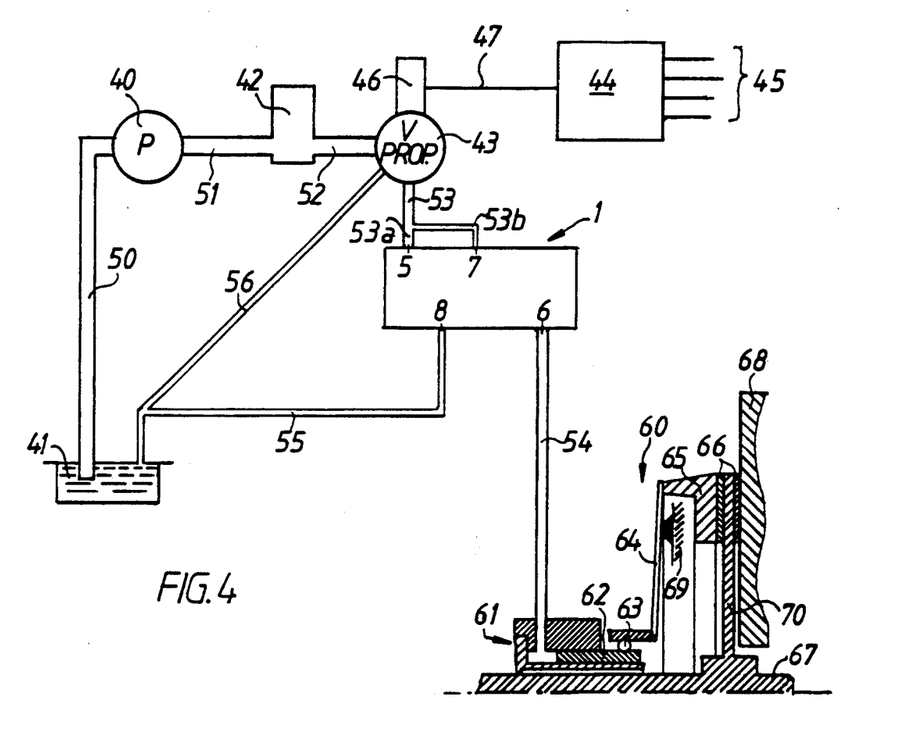
FIG. 4 shows a basic system design, in which the master cylinder according to the invention is incorporated.

The master cylinder 1 is incorporated in a hydraulically operated clutch system, which is shown diagrammatically in FIG. 4. A pump 40 with pressure accumulator 42 provides a required system pressure. The suction side of the pump takes hydraulic fluid from a tank 41 via the pipeline 50 and provides a hydraulic pressure via the pipeline 51 to a pressure accumulator 42. Via the pipeline 52 a proportional valve 43 can then provide a reduced system pressure via the pipeline 53 to the master cylinder 1. An electronic control unit 44 controls the level of the hydraulic pressure to the master cylinder by emitting a control signal via the electric line 47, in which respect the signal level is proportional to the desired regulating pressure on the master cylinder 1 and corresponding degree of disengagement in a conventional friction clutch 60. The level of the control signal is regulated by the control unit 44 as a function of input signals via the electric lines 45. These input signals can represent various vehicle parameters such as the speed of the engine and the input shaft on the transmission box. By detecting these speeds, the slip function of the clutch can be controlled. In automatic transmission systems an input signal can also come from a gear shift sensor which indicates that the driver has ordered transmission, after which the control unit quickly disengages the clutch by means of a high signal being emitted via the electric line 47. Once the new gear has been engaged, acknowledgment contacts on the transmission box give an input signal regarding engagement. A number of other input signals representing parameters such as, for example, brake pedal actuation and accelerator position, can be used by the control unit for operating the clutch.

The master cylinder 1 receives the regulating pressure proportional to the control signal 47 via the branch lines 53a and 53b which are connected to inlets 5 and 7, respectively, on the master cylinder housing. The outlet channel 6 of the master cylinder 1 is in turn connected to a slave cylinder 61 via the pressure line 54. In this case the slave cylinder is mounted centrally around the input shaft 67 of the transmission box with an annular slave cylinder piston 62. The slave cylinder piston 62 acts via a clutch collar 63 on a diaphragm spring 64 incorporated in the clutch. The clutch in FIG. 4 is of the pressure type, in which disengagement is achieved when the slave cylinder presses on the diaphragm spring 64 and the diaphragm spring turns around the abutment 69 which is shown only diagrammatically. The clamping force of the diaphragm spring 64 on the pressure plate 65 and the friction discs 66 on the boss part 70 of the axle 67 is released upon disengagement, by which means the power transmission between the flywheel 68 of the engine and the input shaft 67 of the transmission box ceases.

Drained hydraulic fluid is returned from the channel 8 via the line 55 to the tank 41. Hydraulic fluid is also returned via the line 56 from the master cylinder 1 to the tank 41 when the proportional valve 43 shuts down the supply from the accumulator 42 and the piston returns to the neutral end position.

When the two inlets 5 and 7 of the master cylinder are pressurized by the same regulating pressure from the proportional valve 43, the master cylinder piston 4 begins to leave the neutral end position according to FIG. 1 only when the net pressure force exceeds the force of the return spring 14 on the piston 4. The net pressure force is given by the area difference between the larger and smaller parts of the piston 4 multiplied by the regulating pressure. Consequently, the piston 4 shuts off the channel 7 at a predetermined pressure level given by the return spring force and the area difference. At lower pressure levels, the piston does not move from the neutral end position, but the slave cylinder is given a certain pre-stressing against the diaphragm spring by means of the hydraulic pressure in the restricted channel 7.

Figure 5:
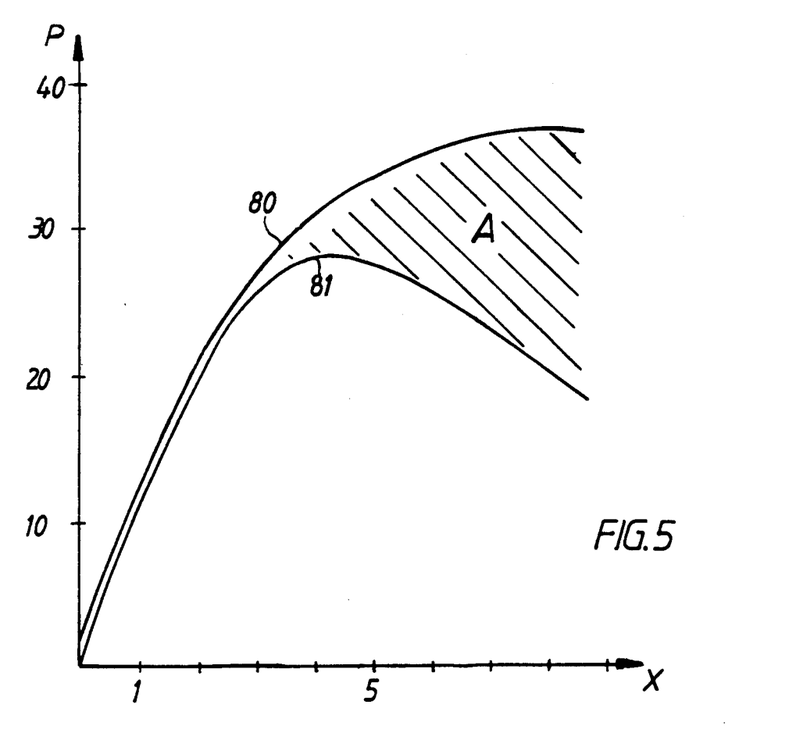
FIG. 5 shows the effect of the proportionality-forming spring on the necessary regulating pressure on the master cylinder.

FIG. 5 shows the effect of the proportionality-forming main spring 13 on the necessary regulating pressure on the master cylinder for disengaging the diaphragm spring clutch. The curve 80 is, for reasons of clarity, displaced somewhat in the negative x-direction. The diagram shows the regulating pressure P as a function of the disengagement degree X. The curve 81 shows how the necessary regulating pressure P for disengagement of a diaphragm spring clutch increases to a disengagement degree X which corresponds to a master cylinder piston movement of approximately 4 mm. However, as the disengagement degree continues to increase, the necessary regulating pressure decreases. This means that an applied regulating pressure can correspond to two disengagement positions. Automation of such a system results in the disadvantage that the system must comprise positional sensors on, for example, the slave cylinder piston. The positional sensors then provide information to the control unit on the disengagement degree of the clutch.

The curve 80 shows instead how the necessary regulating pressure increases with a proportionality-forming spring according to the present invention. When the main spring begins to cooperate with the master cylinder piston in the intermediate position according to FIG. 2, the regulating pressure requirement for the chamber 16 increases from the intermediate position. The increase in the necessary regulating pressure which the main spring demands is shown by the scored area A in FIG. 5. The intermediate position is directly defined by the spring constant of the proportionality-forming spring 13 and the diaphragm spring characteristic. In order for the clutch to obtain a given disengagement position for each regulating pressure, the intermediate position in the first place must occur before the diaphragm spring force begins to reduce for increasing disengagement degree. The spring constant and length of the spring member 13 must then be adapted to the diaphragm spring characteristic so that the intermediate position occurs so early in the disengagement stroke that the spring member 13 has time to develop a force which exceeds the force reduction of the diaphragm spring at the end of the disengagement stroke. This means that a spring member 13 with low spring constant must act on the master cylinder piston earlier during the disengagement stroke, and with a high spring constant the intermediate position where the spring acts on the piston is postponed. Thus, with a proportionality-forming spring in the master cylinder according to the invention, a hydraulically-operated diaphragm spring clutch is obtained in which the regulating pressure level is proportional to the disengagement degree. The requirement for separate positional sensors on the master or slave cylinder is thus dispensed with.

The invention should not be regarded as being limited to the embodiment described, but can be modified in a number of embodiments within the scope of the subsequent patent claims.

We claim:

1. An arrangement for controlling a hydraulically operated disk clutch, wherein the clutch includes clutch disks and a diaphragm spring for normally biasing the clutch disks into engagement, the diaphragm spring being operable against its normal bias to gradually disengage the clutch disks, the arrangement comprising:

hydraulic means for acting on the diaphragm spring, the hydraulic means having a moving element operable between a first end position at which the hydraulic means enables the diaphragm spring to bias the clutch disks into engagement and a second opposite end position where the diaphragm spring is operated against its normal bias to release the engagement of the clutch disks; the hydraulic means having an inlet side which is pressurized for moving the moving element from the first position toward the second position thereof;

a proportioning valve adapted to receive pressure from a pressure source, the proportioning valve being coupled with the inlet side of the hydraulic means; a control unit coupled to the proportioning valve for delivering a control signal to the proportioning valve, said signal being proportional to the extent of disengagement of the clutch disks, said signal controlling the hydraulic pressure supplied to the inlet side of the hydraulic means so that the pressure at the inlet side of the hydraulic means is proportional to variations in the signal from the control unit;

a second spring supported at the hydraulic means and positioned so as not to restrain movement of the moving element from the first position thereof to an intermediate position between the first and second positions, and the second spring being further positioned to be engaged by the moving element following the movement of the moving element from the first to the intermediate positions; upon engaging the moving element, the second spring being adapted for applying increasing force opposing movement of the moving element to the second position and imposing an increasing force requirement while the diaphragm spring is decreasing its engaging force upon the clutch disks, and the second spring being dimentioned and adapted such that a substantially increasing force requirement is obtained over the disengagement stroke of the moving element, at least from the intermediate position to the second end position of the moving element.

2. The arrangement of claim 1, wherein the hydraulic means comprises:

a master cylinder with a bore through it, a master piston axially movable in the master cylinder bore between a first end position corresponding to the first end position of the moving element and an opposite second end position corresponding to the second end position of the moving element, the master cylinder bore having a first inlet side at one side of the master piston and a first outlet side at the other side of the master piston; and further comprising:

a slave cylinder with a bore through it, a slave piston axially movable in the slave cylinder bore between a slave first end position obtained when the master piston is in its first end position and an opposite slave second end position obtained when the master piston is in its second end position; the slave cylinder having a second inlet side at one side of the slave piston; one of the first and second inlet sides being the inlet side of the hydraulic means;

the slave piston being coupled to the diaphragm spring for moving the diaphragm spring;

a pressure line connecting the first outlet side of the master cylinder with the second inlet side of the slave cylinder for hydrostatic transmission of the movement of the master piston through the pressure line to the slave piston, for correspondingly moving the slave piston upon actuation of the proportioning valve, and for causing the slave piston to act on the diaphragm spring, upon movement of the slave piston toward the second position thereof, thereby disengaging the clutch disks;

the second spring being accommodated in at least one of the master cylinder and the slave cylinder and the second spring being shaped and positioned for cooperating with the respective one of the master piston and the slave piston in the respective cylinder in which the second spring is accommodated when the respective piston has reached the intermediate position in moving from the first to the second end positions thereof.

3. The arrangement of claim 2, wherein the master cylinder has a restricted inlet connected to the pressure source and connected into the master cylinder bore at a location such that hydraulic pressure is delivered through the restricted inlet into the first outlet side of the master cylinder when the master piston is in the first end position thereof; the master piston has a radial seal on it which seals the first inlet side from the first outlet side of the master cylinder, and the restricted inlet and the radial seal on the master piston being so placed that the restricted inlet communicates into the first outlet side of the master cylinder only when the master piston is in the first position thereof, and upon the master piston moving off the first position and toward the intermediate and the second positions thereof, the master piston being shaped for blocking entrance into the master cylinder from the restricted inlet.

4. The arrangement of claim 3, wherein the master cylinder is stepped in the axial direction and the master piston is correspondingly shaped such that the master piston has a larger surface area at the first inlet side and has a smaller surface area at the first outlet side and a return spring is arranged in the respective cylinder for biasing the respective piston toward the first position thereof after the respective piston has shifted from the first position to the intermediate position; the second spring in the respective cylinder is so shaped and of such length, and the diaphragm spring and the slave piston in engagement therewith and the master piston are all so shaped and positioned that the intermediate position of the second respective piston, where the spring is first engaged by the respective piston, occurs at a predetermined disengagement position of the diaphragm spring and the clutch disks which is before the diaphragm spring has moved to fully disengage the clutch disks, so that further movement of the respective piston from the intermediate position thereof toward the second position thereof causes the diaphragm spring to disengage increasingly the clutch disks and causes the spring force of the diaphragm spring to decrease.

5. The arrangement of claim 1, wherein the hydraulic means comprises
   a master cylinder with a bore through it, the moving element comprising a master piston axially movable in the master cylinder bore between the first end position and the opposite second end position, the master cylinder bore having a first inlet side at one side of the master piston and a first outlet side at the other side of the master piston; and further comprising:
   a slave cylinder with a bore through it and an axially movable slave piston in the slave cylinder and movable between a first end position obtained when the master piston is in its first end position and an opposite second end position obtained when the master piston is in its second end position; the slave cylinder having a second inlet side at one side of the slave piston, the first inlet side being the inlet side of the hydraulic means;
   the slave piston being coupled to the diaphragm spring for moving the diaphragm spring;
   a pressure line connecting the first outlet side of the master cylinder with the second inlet side of the slave cylinder for hydrostatic transmission of the movement of the master piston through the pressure line to the slave piston, for correspondingly moving the slave piston upon actuation of the proportioning valve, and for causing the slave piston to act on the diaphragm spring, upon movement of the slave piston toward the second position thereof, thereby disengaging the clutch disks;
   the second spring being accommodated in the master cylinder and the second spring thereby cooperating with the master piston when the master piston has reached the intermediate position in moving from the first to the second end positions thereof.

6. The arrangement of claim 5, wherein the master cylinder has a restricted inlet connected to the pressure source and connected into the master cylinder bore at a location such that hydraulic pressure is delivered through the restricted inlet into the first outlet side of the master cylinder when the master piston is in the first end position thereof.

7. The arrangement of claim 6, wherein the master piston has a radial seal on it which seals the first inlet side from the first outlet side of the master cylinder, and the restricted inlet and the radial seal on the master piston being so placed that the restricted inlet communicates into the first outlet side of the master cylinder only when the master piston is in the first position thereof, and upon the master piston moving off the first position and toward the intermediate and the second positions thereof, the master piston being shaped for blocking entrance into the master cylinder from the restricted inlet.

8. The arrangement of claim 7, wherein the master cylinder is stepped in the axial direction and the master piston is correspondingly shaped such that the master piston has a larger surface area at the first inlet side and has a smaller surface area at the first outlet side and a return spring is arranged in the master cylinder for biasing the master piston toward the first position thereof after the master piston has shifted from the first position to the intermediate position.

9. The arrangement of claim 5, wherein the second spring in the master cylinder is so shaped and of such length, and the diaphragm spring and the slave piston in engagement therewith and the master piston are all so shaped and positioned that the intermediate position of the master piston, where the second spring is first engaged by the master piston, occurs at a predetermined disengagement position of the diaphragm spring and the clutch disks which is before the diaphragm spring has moved to disengage fully the clutch disks, so that further movement of the master piston from the intermediate position thereof toward the second position thereof causes the diaphragm spring to disengage increasingly the clutch disks and causes the spring force of the diaphragm spring to decrease.

10. The arrangement of claim 9, wherein the intermediate position of the master piston is related to the spring constant of the second spring, such that at a lower spring constant, the intermediate position of the master piston is relatively closer to the first position of the master piston, and at a higher spring constant, the intermediate position of the master piston is relatively closer to the second end position of the master piston, enabling the force that is exerted by the second spring against the movement of the master piston from the intermediate position toward the second position to develop great enough to compensate for the force reduction of the diaphragm spring on the clutch disks toward the end of the disengagement stroke, which end is at the second position of the master piston.

11. The arrangement of claim 8, wherein the master piston has a second radial seal on it which is axially spaced apart from the first mentioned radial seal on the master piston, and both radial seals sealing the master piston in the master cylinder; the first of the radial seals being located further toward the first outlet side of the master cylinder and being so located that the restricted inlet may deliver hydraulic fluid to the master cylinder first outlet side when the master piston is at the first end position, and the first and second radial seals being respectively so located that with the master piston off the first position, the first radial seal toward the first outlet side of the master cylinder blocks passage of hydraulic pressure from the restricted inlet to the first outlet side; and the second radial seal, which is axially closer to the first inlet side of the master cylinder, blocks hydraulic pressure from the restricted inlet toward the first inlet side of the master cylinder.

12. The arrangement of claim 11, wherein the master cylinder and master piston are respectively so shaped as to define an additional chamber in the master cylinder at the master piston between the larger surface area and the smaller surface area of the master piston; a third radial seal around the master piston between the second seal and the first inlet side of the master cylinder for sealing the additional chamber in the master cylinder, and a drain connection from the additional chamber to atmospheric pressure, thereby avoiding buildup of pressure in the additional chamber during movement of the master piston from the first position toward the second position thereof.

13. The arrangement of claim 7, wherein the master piston has a second radial seal on it which is axially spaced apart from the first mentioned radial seal on the master piston, and both radial seals sealing the master piston in the master cylinder; with the first of the radial seals being located further toward the first outlet side of the master cylinder and being so located that the restricted inlet may deliver hydraulic fluid to the master cylinder first outlet side when the master piston is at the first end position, and the first and second radial seals being respectively so located that with the master piston off the first position, the first radial seal toward the first outlet side of the master cylinder blocks passage of hydraulic pressure from the restricted inlet to the first outlet side; and the second radial seal, which is axially closer to the first inlet side of the master cylinder, blocks hydraulic pressure from the restricted inlet toward the first inlet side of the master cylinder.

14. The arrangement of claim 1, wherein the second spring at the hydraulic means is so shaped and of such length, and the diaphragm spring and the moving element in engagement therewith are all so shaped and positioned that there is an intermediate position of the moving element, where the second spring is first engaged by the moving element, which occurs at a predetermined disengagement position of the diaphragm spring and the clutch disks, and which is before the diaphragm spring has moved to disengage fully the clutch disks so that further movement of the moving element from the intermediate position thereof toward the second position thereof causes the diaphragm spring to disengage increasingly the clutch disks and causes the spring force of the diaphragm spring to decrease.

15. The arrangement of claim 1, wherein the substantially increasing force requirement comprises a substantially proportionally increasing force requirement over substantially the entire disengagement stroke of the moving element.

16. Apparatus for controlling a clutch, wherein the clutch includes clutch disks and a first spring means for normally biasing the clutch disks into engagement, the first spring means having a normal bias and being operable against the normal bias to disengage the clutch disks, the apparatus comprising:

hydraulic means for generating a force acting on the first spring means, the hydraulic means having a moving element movable between a first end position at which the hydraulic means enables the first spring means to bias the clutch disks into engagement and a second opposite end position where the first spring means is operated against the normal bias to release the engagement of the clutch disks; the hydraulic means having an inlet side adapted to be pressurized for moving the moving element from the first position toward the second position thereof;

a second spring means supported at the hydraulic means and positioned so as to not restrain movement of the moving element from the first position thereof to an intermediate position between the first and second positions, the second spring means being further positioned to be engaged by the moving element following movement of the moving element from the first to the intermediate position; the second spring means being adapted to apply increasing force opposing movement of the moving element when the second spring means engages the moving element at the intermediate position, thereby imposing an increasing force requirement on the moving element when the moving element moves from the intermediate position to the second position and the first spring means is decreasing its engaging force upon the clutch disks, said second spring means being dimensioned and adapted such that a substantially increasing force requirement is obtained over the disengagement stroke of the moving element, at least from the intermediate position to the second end position of the moving element.

17. The apparatus of claim 16, wherein the hydraulic means comprises a master cylinder receiving said moving element, said moving element comprising a master piston axially movable in the master cylinder between the first end position and the opposite second end position, the master cylinder having said first inlet side at one side of the master piston and a first outlet side at the other side of the master piston; and further comprising:

a slave cylinder receiving an axially movable slave piston movable between a first end position, obtained when the master piston is in its first end position, and an opposite second end position obtained when the master piston is in its second end position, the slave cylinder having a second inlet side at one side of the slave piston coupled to the first outlet side of the master cylinder;

the slave piston being coupled to the first spring means for moving the first spring means;

said slave piston being moved in said slave cylinder by hydrostatic transmission of fluid through a pressure line coupling the first outlet side of the master cylinder with the second inlet side of the slave cylinder, thereby causing said slave piston to move toward the second position thereof thereby disengaging the clutch disks.

18. The apparatus of claim 17, wherein the master cylinder has a restricted inlet adapted to be coupled to a pressure source and coupled into the master cylinder at a location such that hydraulic pressure is delivered through the restricted inlet into the first outlet side of the master cylinder when the master piston is in the first end position thereof.

19. The apparatus of claim 18, wherein the master piston has a radial seal thereon which seals the first inlet side from the first outlet side of the master cylinder, and the restricted inlet and the radial seal on the master piston being so placed that the restricted inlet communicates into the first outlet side of the master cylinder only when the master piston is in the first position thereof, and upon the master piston moving from the first position and toward the intermediate and the second positions thereof, the master piston being shaped for blocking entrance into the master cylinder from the restricted inlet.

20. The apparatus of claim 19, wherein the master cylinder is stepped in an axial direction and the master piston is correspondingly shaped such that the master piston has a larger surface area at the first inlet side and has a smaller surface area at the first outlet side and a return spring is arranged in the master cylinder for biasing the master piston toward the first position thereof after the master piston has shifted from the first position to the intermediate position.

21. The apparatus of claim 17, wherein the second spring means is so shaped and of such length, and the first spring means and the slave piston in engagement therewith and the master piston are all so shaped and positioned that the intermediate position of the master piston, where the second spring means is first engaged by the master piston, occurs at a predetermined disengagement position of the first spring means and the clutch disks which is before the first spring means has moved to disengage fully the clutch disks, so that further movement of the master piston from the intermediate position thereof toward the second position thereof causes the first spring means to disengage increasingly the clutch disks and causes the spring force of the first spring means to decrease.

22. The apparatus of claim 21, wherein the intermediate position of the master piston is related to the spring constant of the second spring means, such that at a lower spring constant, the intermediate position of the master piston is relatively closer to the first position of the master piston, and at a higher spring constant, the intermediate position of the master piston is relatively closer to the second end position of the master piston, enabling the force that is exerted by the second spring means against the movement of the master piston from the intermediate position toward the second position to develop great enough to compensate for the force reduction of the first spring means on the clutch disks toward the end of the disengagement stroke, which end is at the second position of the master piston.

23. The apparatus of claim 20, wherein the master piston has a second radial seal on it which is axially spaced apart from the first mentioned radial seal on the master piston, and both radial seals sealing the master piston in the master cylinder; the first of the radial seals being located further toward the first outlet side of the master cylinder and being so located that the restricted inlet may deliver hydraulic fluid to the master cylinder first outlet side when the master piston is at the first end position, and the first and second radial seals being respectively so located that with the master piston off the first position, the first radial seal toward the first outlet side of the master cylinder blocks passage of hydraulic pressure from the restricted inlet to the first outlet side; and the second radial seal, which is axially closer to the first inlet side of the master cylinder, blocks hydraulic pressure from the restricted inlet toward the first inlet side of the master cylinder.

24. The apparatus of claim 23, wherein the master cylinder and master piston are respectively so shaped as to define an additional chamber in the master cylinder at the master piston between the larger surface area and the smaller surface area of the master piston; a third radial seal around the master piston between the second seal and the first inlet side of the master cylinder for sealing the additional chamber in the master cylinder, and a drain connection from the additional chamber to atmospheric pressure, thereby avoiding buildup of pressure in the additional chamber during movement of the master piston from the first position toward the second position thereof.

25. The apparatus of claim 19, wherein the master piston has a second radial seal on it which is axially spaced apart from the first mentioned radial seal on the master piston, and both radial seals sealing the master piston in the master cylinder; with the first of the radial seals being located further toward the first outlet side of the master cylinder and being so located that the restricted inlet may deliver hydraulic fluid to the master cylinder first outlet side when the master piston is at the first end position, and the first and second radial seals being respectively so located that with the master piston off the first position, the first radial seal toward the first outlet side of the master cylinder blocks passage of hydraulic pressure from the restricted inlet to the first outlet side; and the second radial seal, which is axially closer to the first inlet side of the master cylinder, blocks hydraulic pressure from the restricted inlet toward the first inlet side of the master cylinder.

26. The apparatus of claim 16, further comprising a proportioning valve adapted to receive pressure from a pressure source, the proportioning valve being coupled with the inlet side of the hydraulic means, a control unit coupled to the proportioning valve for delivering a control signal to the proportioning valve, said control signal being proportional to the extent of disengagement of the clutch disks, said control signal controlling the hydraulic pressure supplied to the inlet side of the hydraulic means so that the pressure at the inlet side of the hydraulic means is proportional to variations in the control signal from the control unit.

27. The apparatus of claim 16, wherein said first spring means comprises a diaphragm spring.

28. The apparatus of claim 16, wherein the substantially increasing force requirement comprises a substantially proportionally increasing force requirement over substantially the entire disengagement stroke of the moving element.

29. The apparatus of claim 16, wherein the intermediate position is closer to the first position if the second spring means has a low spring constant, and closer to the second position if the second spring means has a high spring constant.

* * * * *

UNITED STATES PATENT AND TRADEMARK OFFICE
CERTIFICATE OF CORRECTION

PATENT NO. : 5,060,776
DATED : October 29, 1991
INVENTOR(S) : Lars Skog et al.

It is certified that error appears in the above-identified patent and that said Letters Patent is hereby corrected as shown below:

Title page, at line [73], add the following Assignee:

--Kongsberg Automotive A/S--.

Signed and Sealed this

Second Day of March, 1993

Attest:

STEPHEN G. KUNIN

*Attesting Officer*     Acting Commissioner of Patents and Trademarks